US009787798B2

(12) United States Patent
Pistoia et al.

(10) Patent No.: US 9,787,798 B2
(45) Date of Patent: *Oct. 10, 2017

(54) GENERATING COLLAPSED USER INTERFACE INTERACTION SEQUENCE CONTROLS IN MOBILE APPLICATIONS

(71) Applicant: International Business Machines Corporation, Armonk, NY (US)

(72) Inventors: Marco Pistoia, Amawalk, NY (US); Gegi Thomas, Piermont, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 14/744,114

(22) Filed: Jun. 19, 2015

(65) Prior Publication Data

US 2016/0188144 A1 Jun. 30, 2016

Related U.S. Application Data

(63) Continuation of application No. 14/586,027, filed on Dec. 30, 2014.

(51) Int. Cl.
*G06F 3/00* (2006.01)
*H04L 29/08* (2006.01)

(52) U.S. Cl.
CPC ........ *H04L 67/306* (2013.01); *H04L 67/2823* (2013.01); *H04L 67/34* (2013.01)

(58) Field of Classification Search
CPC .............................. H04L 67/22; H04L 67/306
See application file for complete search history.

(56) References Cited

U.S. PATENT DOCUMENTS

| 7,761,799 | B2 | 7/2010 | Pell et al. |
| 7,802,197 | B2 | 9/2010 | Lew et al. |
| 2002/0115476 | A1 | 8/2002 | Padawer et al. |
| 2006/0026572 | A1 | 2/2006 | Srivastava |
| 2008/0172619 | A1 | 7/2008 | Carrier et al. |
| 2008/0305815 | A1 | 12/2008 | McDonough |
| 2009/0183124 | A1 | 7/2009 | Sridhar et al. |
| 2011/0320957 | A1 | 12/2011 | Tiddens |
| 2016/0188139 | A1 | 6/2016 | Pistoia et al. |

OTHER PUBLICATIONS

Office Action, dated May 20, 2016, regarding U.S. Appl. No. 14/586,027, 18 pages.
List of IBM Patents or Patent Applications Treated as Related, 2 pages.

(Continued)

*Primary Examiner* — Omar Abdul-Ali
(74) *Attorney, Agent, or Firm* — Yee & Associates, P.C.; Daniel P. Morris (57) ABSTRACT

Generating a set of single collapsed user interface interaction sequence controls for an application is provided. A single collapsed user interface interaction control is generated for one or more identified user interface interaction sequences that are collapsible within the application. A customized version of the application is generated for a plurality of users associated with a plurality of registered client devices by inserting each generated single collapsed user interface interaction sequence control into the application.

6 Claims, 5 Drawing Sheets

(56) References Cited

OTHER PUBLICATIONS

Pistoia et al., "Generating Collapsed User Interface Interaction Sequence Controls in Mobile Applications", U.S. Appl. No. 14/586,027, filed Dec. 30, 2014, 38 pages.
Final Office Action, dated Nov. 30, 2016, regarding U.S. Appl. No. 14/568,027, 22 pages.
Notice of Allowance, dated Mar. 8, 2017, regarding U.S. Appl. No. 14/568,027, 5 pages.

GENERATING COLLAPSED USER INTERFACE INTERACTION SEQUENCE CONTROLS IN MOBILE APPLICATIONS

This application is a continuation of application Ser. No. 14/586,027, filed Dec. 30, 2014, the entirety of which is hereby incorporated by reference herein.

BACKGROUND

1. Field

The disclosure relates generally to mobile applications for mobile data processing system devices and more specifically to generating a set of one or more single collapsed user interface interaction sequence controls in a mobile application for user-friendly user interface interactions.

2. Description of the Related Art

Computer technology, in both hardware and software, has enabled mobile data processing system devices, such as, cellular telephones, smart phones, personal digital assistants, laptop computers, tablet computers, handheld computers, gaming devices, smart watches, and the like, to execute programs and applications that previously required a personal desktop computer. These mobile data processing system devices are becoming increasingly popular, but are subject to certain constraints, such as, relatively small display screens. Mobile applications installed on these mobile data processing system devices are heavily based on user interaction. These mobile applications typically utilize touch interfaces, as well as sensor-based input points, and respond to user interaction triggered events by implementing a state machine, for example. Because these mobile applications run on mobile devices that are relatively small in size, a user may be challenged in performing user interface interactions, such as, for example, typing text on a virtual keyboard or making a selection through a drop-down menu, due to the small size of the display screen and resulting small user interface controls displayed on the screen. As a result, usability of a mobile application may depend on the degree to which its user interfaces enable user-friendly interactions.

SUMMARY

According to one illustrative embodiment, a computer-implemented method for generating a set of single collapsed user interface interaction sequence controls for an application is provided. A data processing system generates a single collapsed user interface interaction control for one or more identified user interface interaction sequences that are collapsible within the application. The data processing system generates a customized version of the application for a plurality of users associated with a plurality of registered client devices by inserting each generated single collapsed user interface interaction sequence control into the application. According to other illustrative embodiments, a data processing system and a computer program product for generating a set of single collapsed user interface interaction sequence controls for an application are provided.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
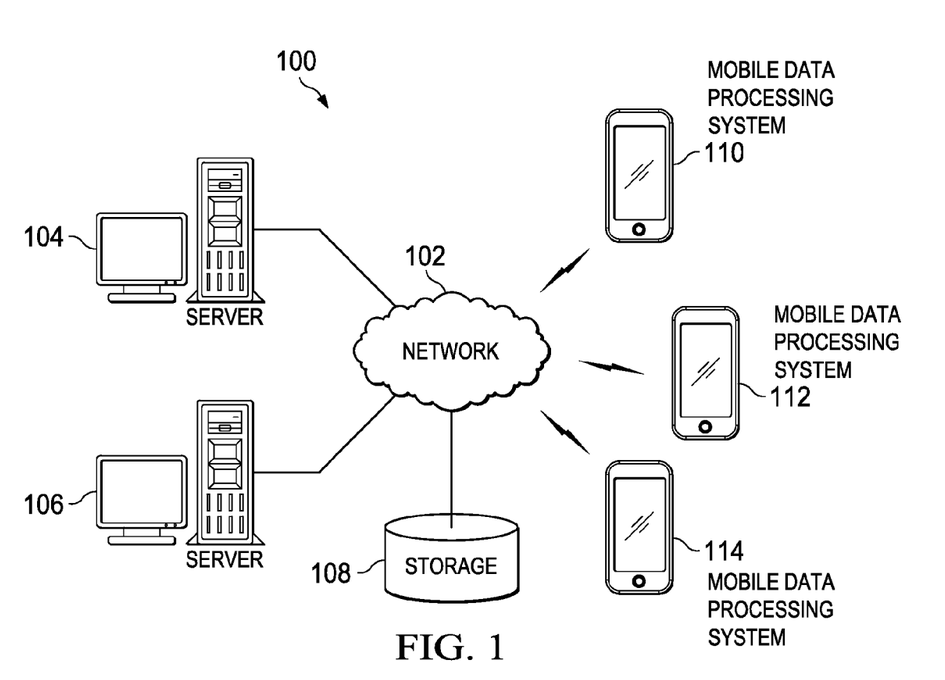
FIG. 1 is a pictorial representation of a network of data processing systems in which illustrative embodiments may be implemented.
Figure 2:
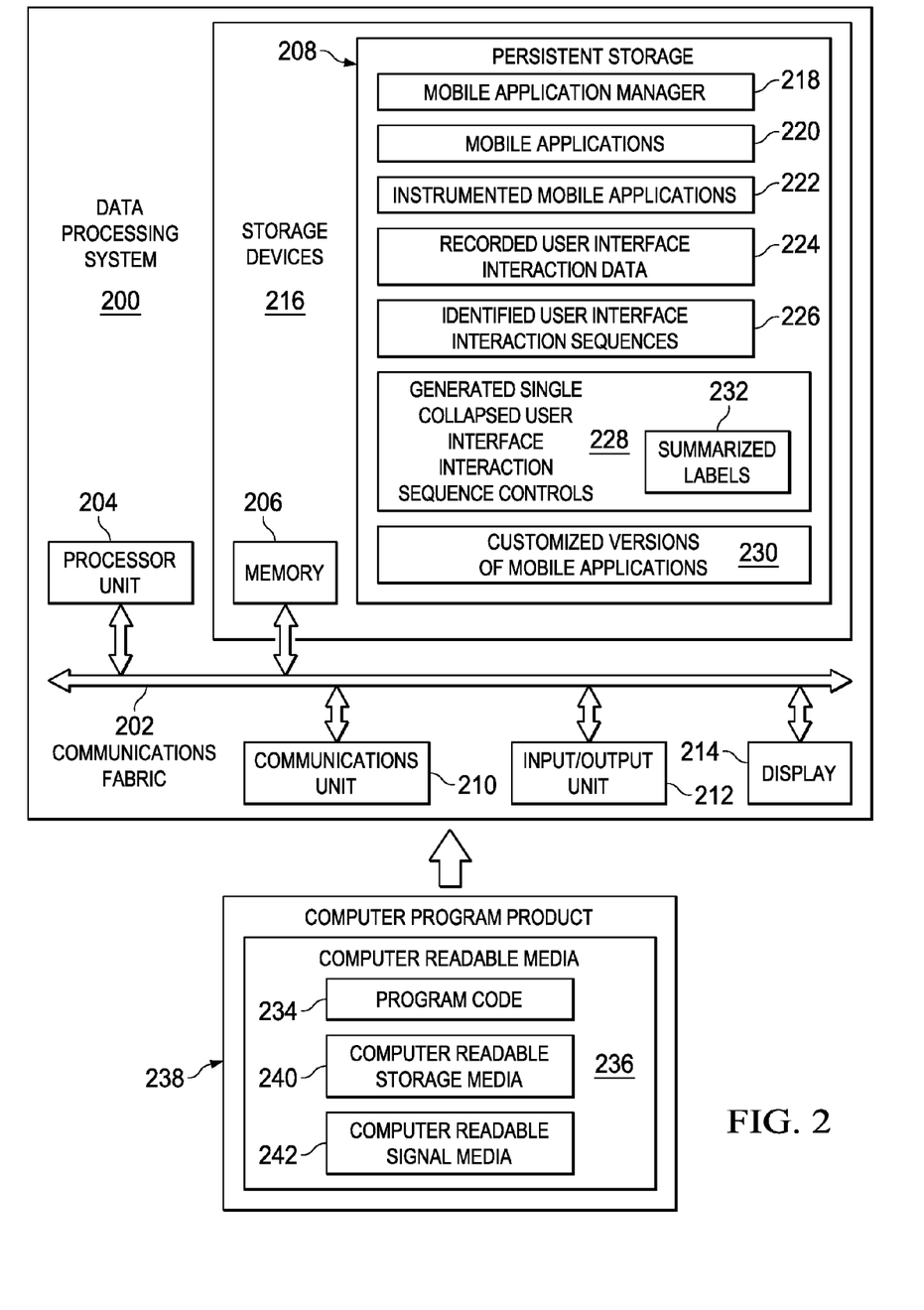
FIG. 2 is a diagram of a data processing system in which illustrative embodiments may be implemented.
Figure 3:
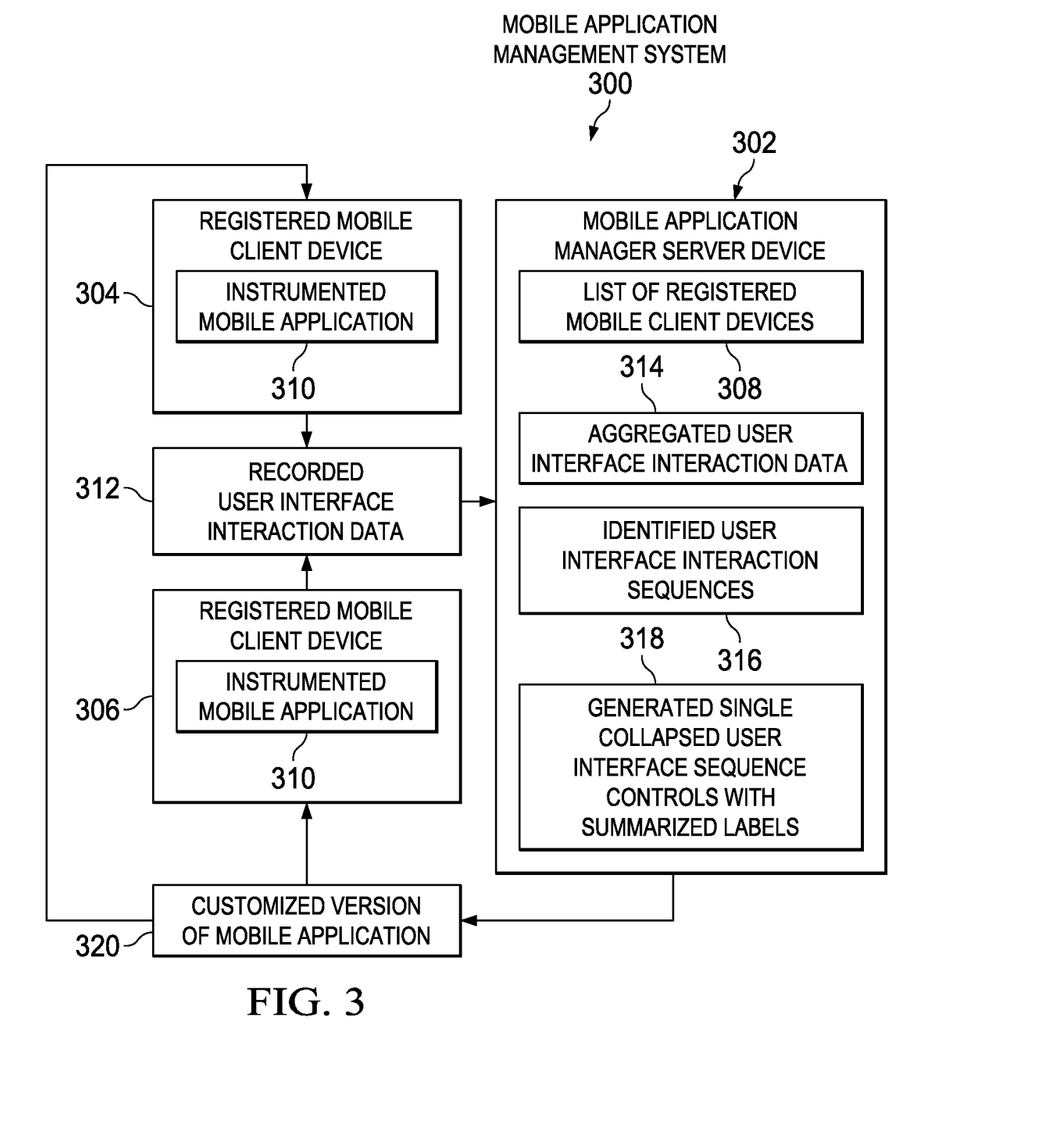
FIG. 3 is a diagram of an example of a mobile application management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, mobile data processing system devices, and other devices in which the illustrative embodiments may be implemented. Network data processing system 100 contains network 102, which is the medium used to provide communications links between the computers, mobile data processing system devices, and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more services to client devices connected to network 102. For example, server 104 and server 106 may provide one or more mobile application management services to users of registered mobile client data processing system devices. A mobile application management service is a process that generates customized or personalized versions of a mobile application for one or more users of registered mobile client data processing system devices by inserting a set of one or more single-step (i.e., collapsed) user interface interaction sequence controls into the mobile application to promote user-friendly user interface interactions within the customized or personalized version of the mobile application. Customized means that the mobile application management service modifies the mobile application for use by a group of registered mobile device users. Personalized means that the mobile application management service modifies the mobile application for use by a particular mobile device user. A collapsed user interface interaction sequence control is a user interface control displayed on a mobile device screen that executes a sequence or series of two or more navigational actions to achieve a user-desired goal state within the mobile application in response to a mobile device user activating the collapsed user interface interaction sequence control within a display.

Mobile data processing system device 110, mobile data processing system device 112, and mobile data processing system device 114 also connect to network 102. Mobile data processing system devices 110, 112, and 114 are registered clients to server 104 or server 106. In the depicted example, server 104 or server 106 may provide information, such as boot files, operating system images, and mobile applications to mobile data processing system devices 110, 112, and 114. In addition, server 104 or server 106 may provide instrumented mobile applications to mobile data processing system devices 110, 112, and 114 to monitor and record user interface interaction data. Further, server 104 or server 106 may provide customized or personalized versions of one or more mobile applications to mobile data processing system devices 110, 112, and 114.

In this example, mobile data processing system devices 110, 112, and 114 are mobile communication devices, such as, for example, cellular telephones or smart phones, with wireless communication links to network 102. However, it should be noted that mobile data processing system devices 110, 112, and 114 are intended as examples only. For example, mobile data processing system devices 110, 112, and 114 also may include laptop computers, tablet computers, handheld computers, personal digital assistants, smart watches, and gaming devices with wireless communication links to network 102.

Storage 108 is a network storage device capable of storing data in a structured format or unstructured format. Storage 108 may provide storage of a plurality of different mobile client device user names and associated identification numbers; user profiles; and user account information associated with the mobile application management service network. Storage 108 also may store mobile application manager applications; a plurality of mobile applications, instrumented mobile applications, and customized and personalized mobile applications; recorded user interface interaction data; identified relevant user interface interaction sequences; and a plurality of collapsed user interface interaction sequence controls with summarized labels. Further, storage unit 108 may store other data, such as authentication or credential data that may include user names, passwords, and biometric data associated with the plurality of users, mobile application developers, and system administrators. It should be noted that storage unit 108 may store any data that may be utilized by the mobile application management service network.

In addition, it should be noted that network data processing system 100 may include any number of additional server devices, mobile client data processing system devices, and other devices not shown. Program code located in network data processing system 100 may be stored on a computer readable storage medium and downloaded to a computer or other data processing device for use. For example, program code may be stored on a computer readable storage medium on server 104 and downloaded to mobile data processing system device 110 over network 102 for use on mobile data processing system device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or mobile data processing system 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores mobile application manager 218, mobile applications 220, instrumented mobile applications 222, recorded user interface interaction data 224, identified user interface interaction sequences 226, generated single collapsed user interface interaction sequence controls 228, and customized versions of mobile applications 230. Mobile application manager 218 is a software program that instruments, manages, and modifies mobile applications 220. Mobile applications 220 represent a plurality of different mobile applications, which are designed to run on mobile devices, such as mobile data processing systems 110, 112, and 114 in FIG. 1.

Mobile application manager 218 instruments mobile applications 220 to generate instrumented mobile applications 222. Instrumented mobile applications 222 include profiling code that monitors and records user interface interaction data produced by users interacting with displayed user interfaces of instrumented mobile applications 222. As a result, instrumented mobile applications 222 generate recorded user interface interaction data 224. Recorded user interface interaction data 224 is a record of the different interactions made by users with displayed user interfaces of instrumented mobile applications 222.

Mobile application manager 218 analyzes recorded user interface interaction data 224 to generate identified user interface interaction sequences 226. Identified user interface interaction sequences 226 are series of two or more navigational action steps taken by one or more users to produce user-desired goal states within instrumented mobile applications 222. Mobile application manager 218 may identify user interface interaction sequences within identified user interface interaction sequences 226 as relevant when, for example, a given user interface interaction sequence includes a number of navigational action steps above a predefined threshold number of navigational action steps. In addition, mobile application manager 218 may identify a given user interface interaction sequence as relevant when the given user interface interaction sequence is utilized by users to achieve a particular user-desired goal state within a given mobile application more than a predefined threshold number of times.

Mobile application manager 218 utilizes identified user interface interaction sequences 226 to generate single collapsed user interface interaction sequence controls, such as generated single collapsed user interface interaction sequence controls 228. In other words, mobile application manager 218 collapses relevant series of two or more navigational action steps that produce user-desired goal states within a mobile application into single executable one-step action user interface controls, which produce the user-desired goal states within the mobile application without a user having to navigate an entire series of action steps.

It should be noted that a series of navigational steps to produce a user-desired goal state with a particular mobile application may include a plurality of different user interface control types, such as graphical icons, radio buttons, menu items, sliders, and the like. In addition, it should be noted that mobile application manager 218 may determine which type of user interface control to collapse the series of navigational action steps into. For example, mobile application manager 218 may collapse a particular series of different user interface control types producing a given user-desired goal state into a single graphical icon.

Further, mobile application manager 218 generates summarized labels, such as summarized labels 232, for generated single collapsed user interface interaction sequence controls 228. A summarized label may be, for example, a contraction of a plurality of identifiers that identify each step in a given series of navigational action steps. Mobile application manager 218 may, for example, display a given summarized label over a corresponding collapsed user interface interaction sequence control for identification.

Furthermore, mobile application manager 218 generates customized versions of mobile applications 230 by inserting a set of one or more generated single collapsed user interface interaction sequence controls into each customized version. In one illustrative embodiment, mobile application manager 218 may customize a particular mobile application by, for example, deleting an existing series of user interface controls that produce a user-desired goal state within the particular mobile application and replacing the deleted series of user interface controls with a single collapsed user interface interaction sequence control that produces the same user-desired goal state. In another illustrative embodiment, mobile application manager 218 may customize the particular mobile application by, for example, inserting the single collapsed user interface interaction sequence control into the particular mobile application without deleting the existing series of user interface controls producing the same user-desired goal state.

Communications unit 210, in this example, provides for communication with other data processing systems or devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206. These instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a server data processing system may be downloaded over a network from the server to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that mobile applications are highly interactive, requiring users to engage in different forms of user interface interactions. Typically, mobile applications execute on mobile devices that have small display screens, virtual keyboards with small keys, and multiple user interface controls covering the display area. These factors degrade a mobile application user's experience, particularly when a user is required to engage in a sequence or series of user interface navigational interactions that consists of multiple steps. As an example, if a mobile application includes a configuration screen that is often accessed and edited by users, and this configuration screen is only reachable via a long series of user interface navigation action steps, such as selecting a given menu, then selecting an associated sub-menu of the given menu, then selecting an associated sub-menu of the first selected sub-menu, et cetera), then the mobile application becomes less user-friendly and the user's experience degrades accordingly.

Although ways of addressing these problems may exist, such as enlarging a relevant portion of a display screen or tilting a mobile device on its side to increase a size of a display, the inconvenience still remains and a user is still required to take burdensome actions, such as enlarging a relevant display area, to facilitate a particular user interface interaction. In addition, although tools may exist in a user interface space for recording and playback, a profiling tool that tracks user interface interactions within a mobile application and provides feedback on a mobile application's user interface design does not currently exist. Illustrative embodiments provide a method for analyzing a mobile application, whereby the analysis aggregates data from a set of one or more users interacting with user interfaces of the mobile application. Based on the analysis of the aggregated user interface interaction data associated with the set of users, illustrative embodiments generate a report on instances where the design of the user interfaces of the mobile application may be optimized to decrease a number of user interface navigational action steps to achieve a user-desired goal state within the mobile application.

A navigational action step is a user interface event that takes a user to a particular location or display within a mobile application and does not modify a current state of the mobile application. For example, a navigational action step may expand or collapse a display screen or open or close a drop-down menu or sub-menu. A mutation action step is a user interface event that modifies or changes a current state of a mobile application. For example, a mutation action step may cause a configuration of the mobile application to change, cause the mobile application to send a network message, or cause data to be entered and persisted in the mobile application. A user interface interaction sequence is a series of two or more navigational action steps followed by a mutation action step. The state of the mobile application following the user interface interaction sequence of navigational action steps and a subsequent mutation action step at the end is referred to as a user-desired goal state.

Illustrative embodiments assume a specification of navigational and mutation action steps for each user interface primitive exposed by a mobile device's operating system platform. The specification is generic for each operating system platform type and is not specific for each mobile application. Consequently, an expert may create the specification once per operating system platform type.

Illustrative embodiments instrument a target mobile application such that any user interface interaction events generated during a user session within the target application are recorded. Illustrative embodiments may log any captured user interface interaction events in a unified statistical model of user interface interactions, for example. Illustrative embodiments may distribute the instrumented version of the target mobile application, instead of the original mobile application, to a plurality of registered mobile client devices for use by a plurality of different users. Alternatively, illustrative embodiments may make the instrumented version of the target mobile application available via a centralized application store or repository.

Illustrative embodiments receive the user interface interaction data from the plurality of registered mobile client devices associated with the plurality of different users and then aggregate the user interface interaction data into the unified statistical model describing the user interface interactions across the entire population of users. The unified statistical model may, for example, represent a number of steps within each different logged user interface interaction sequence and may also capture the different user interface interaction sequences that arrive at the same user-desired goal state using a graphical representation.

Based on analyzing the unified statistical model of user interface interactions, illustrative embodiments may execute one or more actions. For example, if multiple different user interface interaction sequences leading to a given user-desired goal state within a mobile application exist, but most users follow a suboptimal sequence of navigational actions with an increased number of steps, then illustrative embodiments may issue a report to an application developer indicating that the user interface interaction sequence does not invite a user to engage in an optimal sequence of interaction steps to arrive at the user-desired goal state. If a particular user interface interaction sequence includes a large number a steps (i.e., above a threshold number of steps with no alternative user interface interaction sequence that is shorter) and is frequently used by users, then illustrative embodiments may issue a report indicating that the common use realized through this particular user interface interaction sequence is not implemented in a user-friendly manner. If many instances of a partial user interface navigational sequence exist, which may likely correspond to a situation where a user is searching for a given mutation action step, but is unable to find it, then illustrative embodiments may issue a report indicating that the particular user interface navigational sequence to arrive at the user-desired goal state is confusing and complicates execution of common use cases.

As a result, illustrative embodiments utilize a new approach for solving the problem of managing user interface interactions in a mobile setting by monitoring and recording user interface interaction events within mobile applications to derive relevant user interface interaction sequences. Then, illustrative embodiments collapse the plurality of steps included in these relevant user interface interaction sequences to generate direct one-step user interface interaction sequence controls for each of the different relevant user interface interaction sequences. As an example, consider a mobile application that contains menu-based user interface interactions. The menu depth is three in this example. That is, the first menu leads to a sub-menu, which in turn leads to a sub-sub-menu. Assume that a given user is often interested in utilizing the same navigational sequence of steps through the hierarchy of menus and sub-menus. The navigational sequence of user interface interaction steps in the hierarchy in this example are as follows:

Main or outermost menu: Save As/Copy/Paste/Clear/ . . . ;

First inner sub-menu: Local File/Clipboard Data/Cloud File/ . . . ; and

Second or innermost sub-menu: JPEG/GIF/PNG/ . . . \

Illustrative embodiments collapse or contract the navigational sequence of user interface interaction steps into, for example, a generated menu control, which may already be at the level of the main or outermost menu. Illustrative embodiments may identify the newly generated menu control by generating a summarized label, which may read "Save as local file of type JPEG", for example. To generate this single collapsed user interface interaction sequence control with summarized label, illustrative embodiments utilize two capabilities: 1) Runtime monitoring and recording of user interface interactions. To track patterns of sequences of user interface interactions, illustrative embodiments instrument a target mobile application with profiling code such that user interface interaction events are recorded; and 2) Dynamic user interface rewriting. After illustrative embodiments determine relevant patterns of sequences of user interface interactions, which may be based on a prefix of execution of the target mobile application and/or a history of past executions of the target mobile application, illustrative embodiments may modify a configuration of a set of one or more user interfaces within the target mobile application and a behavior of the target mobile application by, for example, generating a new single one-step menu control with summarized label as illustrated in the example above.

Illustrative embodiments are enabled because most modern user interfaces are developed using JavaScript, as well as declarative specification languages, such as layout XML. This standardized development of user interfaces permits instrumentation of user interface interaction events, as well as the ability to dynamically rewrite and modify the user interfaces. Illustrative embodiments may dynamically rewrite a user interface control by disabling the user interface control, modifying the user interface control, deleting the user interface control, promoting the user interface control (e.g., moving the user interface control toward a beginning of a navigational sequence), demoting the user interface control (e.g., moving the user interface control toward an end of the navigational sequence), or resizing the user interface control (e.g., increasing or decreasing a size of the user interface control based on frequency of user interaction).

Illustrative embodiments determine and generate a one-step user interface interaction sequence control that enables direct execution of an entire sequence of action steps, such as, for example, executing a top-hierarchy menu control to achieve a user-desired goal state, instead of executing a deeply nested sub-menu control to achieve the same user-desired goal state, or executing a one-step user interface interaction sequence auto-complete control to insert text that a user commonly searches for. Illustrative embodiments insert a set of one or more one-step user interface interaction sequence controls into an original (i.e., uninstrumented) version of a target mobile application to generate a customized version of the target mobile application that includes the set of one-step user interface interaction sequence controls personalized to a set of one or more users.

Beyond dynamically transforming a user interface control, illustrative embodiments also collect semantic profiling data corresponding to the user interface control to generate a summarized label for the newly generated one-step user interface control. Illustrative embodiments identify user-desired goal states and the navigational sequence paths reaching those user-desired goal states. This enables, for example, illustrative embodiments to propose alternative, yet existing, navigational sequence paths to reach those user-desired goal states.

Illustrative embodiments may compute user interface control transformations or recommendations based on a plurality of different users or on one user. First, illustrative embodiments identify user-desired goal states and find optimal navigational sequence paths toward those user-desired goal states within existing user interface controls based on recorded user interface interaction data. Then, illustrative embodiments transform one or more of the existing user interface interaction sequences into a one-step or single collapsed user interface interaction control to achieve those user-desired goal states with optimal functionality sought by the different users.

With reference now to FIG. 3, a diagram illustrating an example of a mobile application management system is depicted in accordance with an illustrative embodiment. Mobile application management system 300 may be, for example, implemented in a network of data processing systems, such as network data processing system 100 in FIG. 1. Mobile application management system 300 is a system of hardware and software components that monitor and record user interface interaction data in a mobile application installed on registered mobile client devices, analyze the recorded user interface interaction data to identify relevant user interface interaction sequences that arrive at user-desired goal states within the mobile application, collapse each relevant user interface interaction sequence into a single user interface interaction sequence control that arrives at a corresponding user-desired goal state, insert each single collapsed user interface interaction control into the mobile application to customize the mobile application to a set of users using the registered mobile client devices, and deploy the customized mobile application to the registered mobile client devices.

Mobile application management system 300 includes mobile application manager server device 302, registered mobile client device 304, and registered mobile client device 306. Mobile application manager server device 302 may be, for example, server 104 in FIG. 1 or data processing system 200 in FIG. 2. In addition, mobile application manager server device 302 may represent a plurality of mobile application manager server devices. Registered mobile client devices 304 and 306 may be, for example, mobile data processing systems 110 and 112 in FIG. 1. Further, registered mobile client devices 304 and 306 may represent any number of registered mobile client devices.

Mobile application manager server device 302 provides mobile application management services to registered mobile client devices 304 and 306 using list of registered mobile client devices 308. Registered mobile client devices 304 and 306 include instrumented mobile application 310. It should be noted that instrumented mobile application 310 may represent any type of mobile application. In addition, instrumented mobile application 310 may represent a same type of mobile application or different types of mobile applications. Also, mobile application manager server device 302 may instrument and deploy instrumented mobile application to registered mobile client devices 304 and 306. Alternatively, registered mobile client devices 304 and 306 may download instrumented mobile application 310 from a central application store or repository.

Instrumented mobile application 310 monitors and records user interface interaction data of users interacting with user interfaces to achieve a user-desired goal state within instrumented mobile application 310. Registered mobile client devices 304 and 306 transmit recorded user interface interaction data 312 to mobile application manager server device 302. Upon receiving recorded user interface interaction data 312, mobile application manager server device 302 may aggregate recorded user interface interaction data 312 received from registered mobile client devices 304 and 306. Mobile application manager server device 302 may aggregate recorded user interface interaction data 312 in a unified statistical model of user interface interactions, for example.

Based on an analysis of the data within the unified statistical model of user interface interactions, mobile application manager server device 302 may identify one or more relevant user interface interaction sequences, such as identified user interface interaction sequences 316, which arrive at one or more user-defined goal states within instrumented mobile application 310. Mobile application manager server device 302 may utilize identified user interface interaction sequences 316 to generate a set of one or more single collapsed user interface interaction sequence controls with summarized labels, such as generated single collapsed user interface interaction sequence controls with summarized labels 318. Mobile application manager server device 302 may insert generated single collapsed user interface interaction sequence controls with summarized labels 318 into an original, uninstrumented version of instrumented mobile application 310 to generate customized version of mobile application 320.

Afterward, mobile application manager server device 302 may deploy customized version of mobile application 320 to registered mobile client devices 304 and 306. Users utilizing customized version of mobile application 320 deployed to registered mobile client devices 304 and 306 may execute an entire user interface interaction sequence within customized version of mobile application 320 by activating a corresponding single collapsed user interface interaction sequence control displayed in customized version of mobile application 320.

Figure 4:
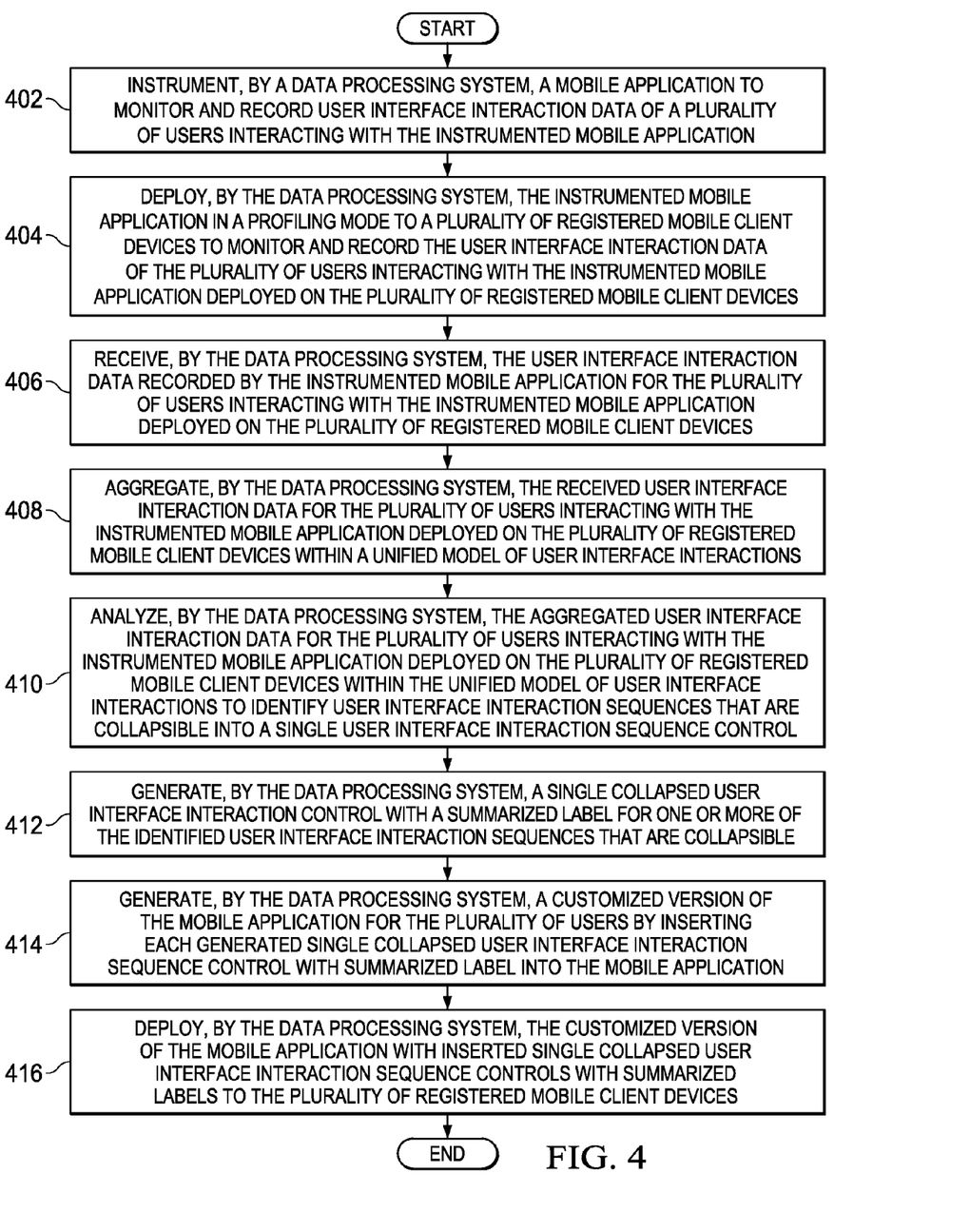
FIG. 4 is a flowchart illustrating a process for generating a customized version of a mobile application for a plurality of users by a server data processing system device in accordance with an illustrative embodiment.

With reference now to FIG. 4, a flowchart illustrating a process for generating a customized version of a mobile application for a plurality of users by a server data processing system device is shown in accordance with an illustrative embodiment. The process shown in FIG. 4 may be implemented in a server device, such as, for example, server 104 in FIG. 1 or mobile application manager server 302 in FIG. 3. Also, the process shown in FIG. 4 may be implemented in a data processing system, such as data processing system 200 in FIG. 2.

The process begins when the data processing system instruments a mobile application to monitor and record user interface interaction data of a plurality of users interacting with the instrumented mobile application (step 402). Afterward, the data processing system deploys the instrumented mobile application in a profiling mode to a plurality of registered mobile client devices to monitor and record the user interface interaction data of the plurality of users interacting with the instrumented mobile application deployed on the plurality of registered mobile client devices (step 404). The instrumented mobile application may be, for example, instrumented mobile application 310 in FIG. 3. The registered mobile client devices may be, for example, registered mobile client devices 304 and 306 in FIG. 3.

Subsequently, the data processing system receives the user interface interaction data recorded by the instrumented mobile application for the plurality of users interacting with the instrumented mobile application deployed on the plurality of registered mobile client devices (step 406). For example, mobile application manager server device 302 receives recorded user interface interaction data 312 from instrumented mobile application 310 deployed on registered mobile clients 304 and 306 in FIG. 3. Then, the data processing system aggregates the received user interface interaction data for the plurality of users interacting with the instrumented mobile application deployed on the plurality of registered mobile client devices within a unified model of user interface interactions, such as aggregated user interface interaction data 314 in FIG. 3 (step 408).

The data processing system analyzes the aggregated user interface interaction data for the plurality of users interacting with the instrumented mobile application deployed on the plurality of registered mobile client devices within the unified model of user interface interactions to identify user interface interaction sequences that are collapsible into a single user interface interaction sequence control, such as identified user interface interaction sequences 316 in FIG. 3 (step 410). In addition, the data processing system generates a single collapsed user interface interaction control with a summarized label for one or more of the identified user interface interaction sequences that are collapsible, such as generated single collapsed user interface interaction controls with summarized labels 318 in FIG. 3 (step 412).

Afterward, the data processing system generates a customized version of the mobile application, such as customized version of mobile application 320 in FIG. 3, for the plurality of users by inserting each generated single collapsed user interface interaction sequence control with summarized label into the mobile application (step 414). Then, the data processing system deploys the customized version of the mobile application with inserted single collapsed user interface interaction sequence controls with summarized labels to the plurality of registered mobile client devices (step 416). For example, mobile application manager server device 302 deploys customized version of mobile application 320 to registered mobile clients 304 and 306. The process terminates thereafter.

Figure 5:
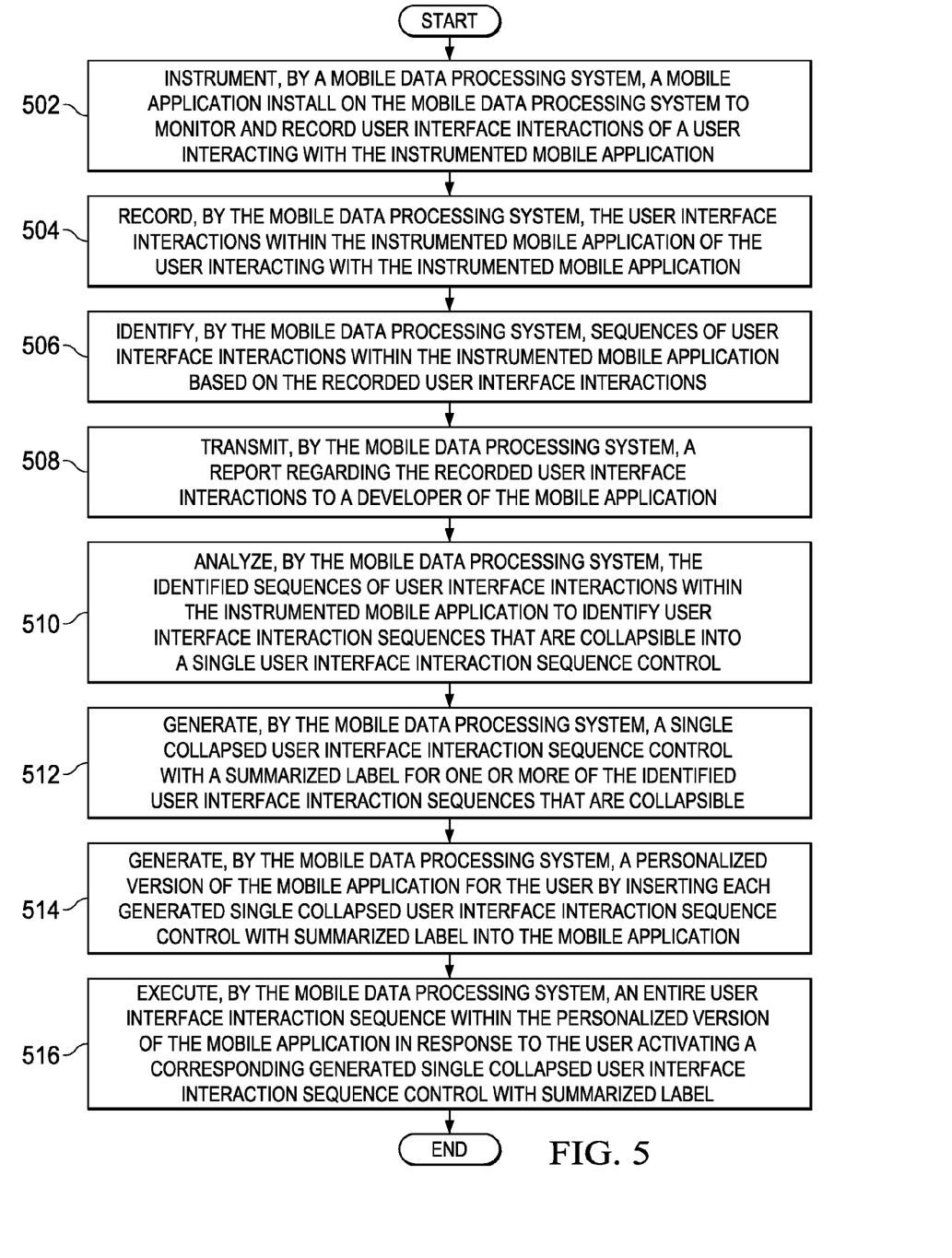
FIG. 5 is a flowchart illustrating a process for generating a personalized version of a mobile application for a user by a mobile data processing system device in accordance with an illustrative embodiment.

With reference now to FIG. 5, a flowchart illustrating a process for generating a personalized version of a mobile application for a user by a mobile data processing system device is shown in accordance with an illustrative embodiment. The process shown in FIG. 5 may be implemented in a mobile data processing system, such as, for example, mobile data processing system 110 in FIG. 1. Also, the process shown in FIG. 5 may be implemented in a data processing system, such as data processing system 200 in FIG. 2.

The process begins when the mobile data processing system instruments a mobile application install on the mobile data processing system to monitor and record user interface interactions of a user interacting with the instrumented mobile application (step 502). The mobile application may be, for example, one of the mobile applications in mobile applications 220 in FIG. 2. Afterward, the mobile data processing system records the user interface interactions within the instrumented mobile application of the user interacting with the instrumented mobile application (step 504). The recorded user interface interactions may be, for example, recorded user interface interaction data 224 in FIG. 2.

Subsequently, the mobile data processing system identifies sequences of user interface interactions within the instrumented mobile application based on the recorded user interface interactions (step 506). The identified sequences of user interface interactions may be, for example, identified user interface interactions sequences 226 in FIG. 2. In addition, the mobile data processing system transmits a report regarding the recorded user interface interactions to a developer of the mobile application (step 508).

Further, the mobile data processing system analyzes the identified sequences of user interface interactions within the instrumented mobile application to identify user interface interaction sequences that are collapsible into a single user interface interaction sequence control (step 510). Then, the mobile data processing system generates a single collapsed user interface interaction sequence control with a summarized label for one or more of the identified user interface interaction sequences that are collapsible (step 512). The generated single collapsed user interface interaction sequence control with a summarized label may be, for example, one of generated single collapsed user interface interaction sequence controls 228 with a corresponding summarized label in summarized labels 232 in FIG. 2.

Furthermore, the mobile data processing system generates a personalized version of the mobile application for the user by inserting each generated single collapsed user interface interaction sequence control with summarized label into the mobile application (step 514). The personalized version of the mobile application may be, for example, one of customized versions of mobile applications 230 in FIG. 2. Afterward, the mobile data processing system executes an entire user interface interaction sequence within the personalized version of the mobile application in response to the user activating a corresponding generated single collapsed user interface interaction sequence control with summarized label (step 516). The process terminates thereafter.

Thus, illustrative embodiments provide a computer-implemented method, data processing system, and computer program product for generating a set of single collapsed user interface interaction sequence controls for a mobile application installed on a mobile device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for generating a set of single collapsed user interface interaction sequence controls for an application, the computer-implemented method comprising:

generating, by a data processing system, a single collapsed user interface interaction control for one or more identified user interface interaction sequences that are collapsible within the application;

generating, by the data processing system, a customized version of the application for a plurality of users associated with a plurality of registered client devices by inserting each generated single collapsed user interface interaction sequence control into the application;

instrumenting, by the data processing system, the application to monitor and record user interface interaction data of the plurality of users interacting with the instrumented application;

deploying, the data processing system, the instrumented application in a profiling mode to the plurality of registered client devices to monitor and record the user interface interaction data of the plurality of users interacting with the instrumented application deployed on the plurality of registered client devices;

receiving, by the data processing system, user interface interaction data recorded by an instrumented version of the application for the plurality of users interacting with the instrumented version of the application deployed on the plurality of registered client devices;

aggregating, by the data processing system, the received user interface interaction data for the plurality of users interacting with the instrumented version of the application deployed on the plurality of registered client devices within a unified model of user interface interactions; and analyzing, by the data processing system, the aggregated user interface interaction data for the plurality of users interacting with the instrumented version of the application deployed on the plurality of registered client devices within the unified model of user interface interactions to identify user interface interaction sequences that are collapsible into a corresponding single user interface interaction sequence control.

2. The computer-implemented method of claim 1, wherein an identified user interface interaction sequence includes a number of navigational action steps above a predefined threshold number of navigational action steps leading to a corresponding goal state of the instrumented version of the application.

3. The computer-implemented method of claim 1 further comprising:

deploying, by the data processing system, the customized version of the application with inserted single collapsed user interface interaction sequence controls to the plurality of registered client devices.

4. The computer-implemented method of claim 1 further comprising:

transmitting, by the data processing system, a report regarding recorded user interface interactions to a developer of the application.

5. The computer-implemented method of claim 1, wherein an entire user interface interaction sequence leading to a goal state is executed within the customized version of the application in response to a user activating a corresponding single collapsed user interface interaction sequence control.

6. The computer-implemented method of claim 1, wherein each generated single collapsed user interface interaction sequence control includes a corresponding summarized label that is a contraction of identifiers identifying steps within an associated user interface interaction sequence of steps leading to a particular goal state within the customized version of the application.

* * * * *